United States Patent
Simcik et al.

(10) Patent No.: US 10,315,884 B2
(45) Date of Patent: Jun. 11, 2019

(54) AUTOMATIC DETERMINATION OF ELEVATOR USER'S CURRENT LOCATION AND NEXT DESTINATION WITH MOBILE DEVICE TECHNOLOGY

(71) Applicant: Otis Elevator Company, Farmington, CT (US)

(72) Inventors: Paul A. Simcik, Southington, CT (US); Ashley Chapman, Plainville, CT (US); Bradley Armand Scoville, Farmington, CT (US); Eric C. Peterson, East Longmeadow, MA (US); Michael Garfinkel, West Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 32 days.

(21) Appl. No.: 15/316,122

(22) PCT Filed: Apr. 28, 2015

(86) PCT No.: PCT/US2015/028055
§ 371 (c)(1),
(2) Date: Dec. 2, 2016

(87) PCT Pub. No.: WO2015/187266
PCT Pub. Date: Dec. 10, 2015

(65) Prior Publication Data
US 2017/0137255 A1    May 18, 2017

Related U.S. Application Data

(60) Provisional application No. 62/007,109, filed on Jun. 3, 2014.

(51) Int. Cl.
*B66B 1/46* (2006.01)
*B32B 27/08* (2006.01)
(Continued)

(52) U.S. Cl.
CPC ............. *B66B 1/468* (2013.01); *B32B 27/08* (2013.01); *B32B 27/306* (2013.01);
(Continued)

(58) Field of Classification Search
CPC ........ B66B 1/468; B66B 1/2201; B66B 1/168
(Continued)

(56) References Cited

U.S. PATENT DOCUMENTS 6,109,396 A    8/2000    Sirag et al.
6,223,160 B1   4/2001    Kostka et al.
(Continued)

FOREIGN PATENT DOCUMENTS

CN    1973302 A     5/2007
CN    102887404 A   1/2013
(Continued)

OTHER PUBLICATIONS

European Patent Office, International Search Report, dated Jul. 9, 2015.
(Continued)

*Primary Examiner* — David S Warren
(74) *Attorney, Agent, or Firm* — Cantor Colburn LLP

(57) ABSTRACT

A method for automatically dispatching an elevator 110 based on a user's location is provided. The method includes querying a device 104 to determine a user's source floor and confirming the user's source floor. The method also includes querying the device to suggest the user's destination floor based on a history of destination floors traveled to by the user; and confirming the user's destination floor.

13 Claims, 2 Drawing Sheets

(51) Int. Cl.
  *B32B 27/30* (2006.01)
  *B32B 27/32* (2006.01)
  *A61J 1/10* (2006.01)
  *A61J 1/14* (2006.01)

(52) U.S. Cl.
  CPC ............ *B32B 27/308* (2013.01); *B32B 27/32* (2013.01); *A61J 1/10* (2013.01); *A61J 1/1468* (2015.05); *B32B 2307/7265* (2013.01); *B32B 2439/46* (2013.01); *B66B 2201/103* (2013.01); *B66B 2201/463* (2013.01); *B66B 2201/4615* (2013.01); *B66B 2201/4653* (2013.01); *Y10T 428/1334* (2015.01); *Y10T 428/1341* (2015.01); *Y10T 428/265* (2015.01); *Y10T 428/2826* (2015.01)

(58) Field of Classification Search
  USPC .......................................................... 187/380
  See application file for complete search history.

(56) References Cited

U.S. PATENT DOCUMENTS

| | | | |
|---|---|---|---|
| 6,382,363 B1* | 5/2002 | Friedli | B66B 1/468 187/384 |
| 6,868,945 B2 | 3/2005 | Schuster et al. | |
| 7,281,610 B2 | 10/2007 | Ylinen et al. | |
| 7,377,364 B2 | 5/2008 | Tyni et al. | |
| 7,610,995 B2 | 11/2009 | Ylinen et al. | |
| 7,882,939 B2 | 2/2011 | Nakamura | |
| 8,047,333 B2 | 11/2011 | Finschi et al. | |
| 8,136,636 B2* | 3/2012 | Bahjat | B66B 1/463 187/391 |
| 8,151,942 B2 | 4/2012 | Rusanen et al. | |
| 8,485,317 B2* | 7/2013 | Gerstenkorn | B66B 1/468 187/247 |
| 8,499,895 B2 | 8/2013 | Zweig | |
| 9,878,875 B1* | 1/2018 | Scoville | B66B 1/468 |
| 9,896,305 B2* | 2/2018 | Blandin | B66B 1/468 |
| 2007/0041352 A1 | 2/2007 | Frankel | |
| 2008/0011557 A1 | 1/2008 | Hakala et al. | |
| 2011/0308891 A1 | 12/2011 | Friedli | |
| 2012/0031711 A1 | 2/2012 | Gerstenkorn et al. | |
| 2012/0048655 A1 | 3/2012 | Hsu | |
| 2012/0253658 A1 | 10/2012 | Kappeler | |
| 2013/0116835 A1 | 5/2013 | Nowel | |
| 2013/0153339 A1* | 6/2013 | Sarjanen | B66B 1/468 187/382 |
| 2013/0297093 A1 | 11/2013 | Nowel | |
| 2014/0131142 A1* | 5/2014 | Parkkinen | B66B 3/006 187/382 |
| 2015/0075914 A1* | 3/2015 | Armistead | B66B 1/46 187/247 |
| 2015/0246790 A1* | 9/2015 | Hiltunen | B66B 1/461 187/382 |
| 2016/0251199 A1* | 9/2016 | Kronkvist | B66B 1/468 187/381 |
| 2016/0272460 A1* | 9/2016 | Simcik | B66B 1/468 |
| 2016/0304312 A1* | 10/2016 | Thompson | G06Q 30/0633 |
| 2016/0325962 A1* | 11/2016 | Blandin | B66B 1/468 |
| 2016/0347578 A1* | 12/2016 | Simcik | B66B 1/463 |
| 2016/0355375 A1* | 12/2016 | Simcik | B66B 1/468 |
| 2017/0088397 A1* | 3/2017 | Buckman | H04W 4/80 |
| 2017/0115122 A1* | 4/2017 | Salmikuukka | B66B 1/468 |
| 2017/0129739 A1* | 5/2017 | Simcik | B66B 1/468 |
| 2017/0137255 A1* | 5/2017 | Simcik | B66B 1/468 |
| 2017/0300820 A1* | 10/2017 | Raitola | B66B 1/3461 |
| 2017/0305716 A1* | 10/2017 | Peterson | B66B 1/468 |
| 2017/0341903 A1* | 11/2017 | Adkins | B66B 1/463 |
| 2017/0355556 A1* | 12/2017 | Simcik | B66B 1/468 |

FOREIGN PATENT DOCUMENTS

| | | |
|---|---|---|
| CN | 202717457 U | 2/2013 |
| CN | 103274272 A | 9/2013 |
| CN | 103449267 A | 12/2013 |
| CN | 103459284 A | 12/2013 |
| CN | 103475705 A | 12/2013 |
| CN | 103803360 A | 5/2014 |
| EP | 2730530 B1 | 5/2014 |
| JP | 2007276961 A | 10/2007 |
| WO | 2002066357 A1 | 8/2002 |
| WO | 2006011876 A1 | 2/2006 |
| WO | 2014001082 A1 | 1/2014 |

OTHER PUBLICATIONS

European Patent Office, Written Opinion of the International Searching Authority, dated Jul. 9, 2015.
Chinese First Office Action for application CN 2015800295138, dated Apr. 3, 2018, 8 pages.
Kone, "Kone RemoteCall", available at: https://www.kone.us/Images/kone-remotecall-fact-sheet_tcm25-18766.pdf, 2015, 2 pages.
Chinese Second Office Action and Search Report for application CN 201580029513.8, dated Oct. 31, 2018, 10 pages.

* cited by examiner

AUTOMATIC DETERMINATION OF ELEVATOR USER'S CURRENT LOCATION AND NEXT DESTINATION WITH MOBILE DEVICE TECHNOLOGY

CROSS-REFERENCE TO RELATED APPLICATIONS

The present application is a U.S. national stage of, and claims the priority benefit of, International Patent Application Serial No. PCT/US2015/028044, filed Apr. 28, 2015 and also claims the priority benefit of U.S. Application Ser. No. 62/007,109 filed Jun. 3, 2014, the text and drawings of which are hereby incorporated by reference in their entireties.

TECHNICAL FIELD OF THE DISCLOSED EMBODIMENTS

The presently disclosed embodiments generally relate to elevator systems, and more particularly, to a system for automatically determining the source floor and destination floor of an elevator user.

BACKGROUND OF THE DISCLOSED EMBODIMENTS

Currently, mobile devices allow users to enter source and destination floors when using an elevator. These devices require the elevator user to provide both the source floor and destination floor when requesting to use the elevator. Some products provide a favorites feature to minimize re-entering the same information. A need remains for a system that automatically determines the source floor and the destination floor of the elevator user.

SUMMARY OF THE DISCLOSED EMBODIMENTS

In at least one embodiment, a method for automatically dispatching an elevator based on a user's location is provided. The method includes querying a device to determine a user's source floor and confirming the user's source floor. The method also includes querying the device to suggest the user's destination floor based on a history of destination floors traveled to by the user; and confirming the user's destination floor.

In at least one embodiment, a method for automatically dispatching an elevator based on a user's location is provided. The method includes querying a user's mobile device for source floor data and destination floor data. The source floor of the user is determined based on the source floor data. A user input is requested to confirm the source floor. A destination floor of the user is suggested based on the destination floor data. A user input is requested to confirm the destination floor. The source floor data and the destination floor data are updated based on a source floor and a destination floor selected by the user.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
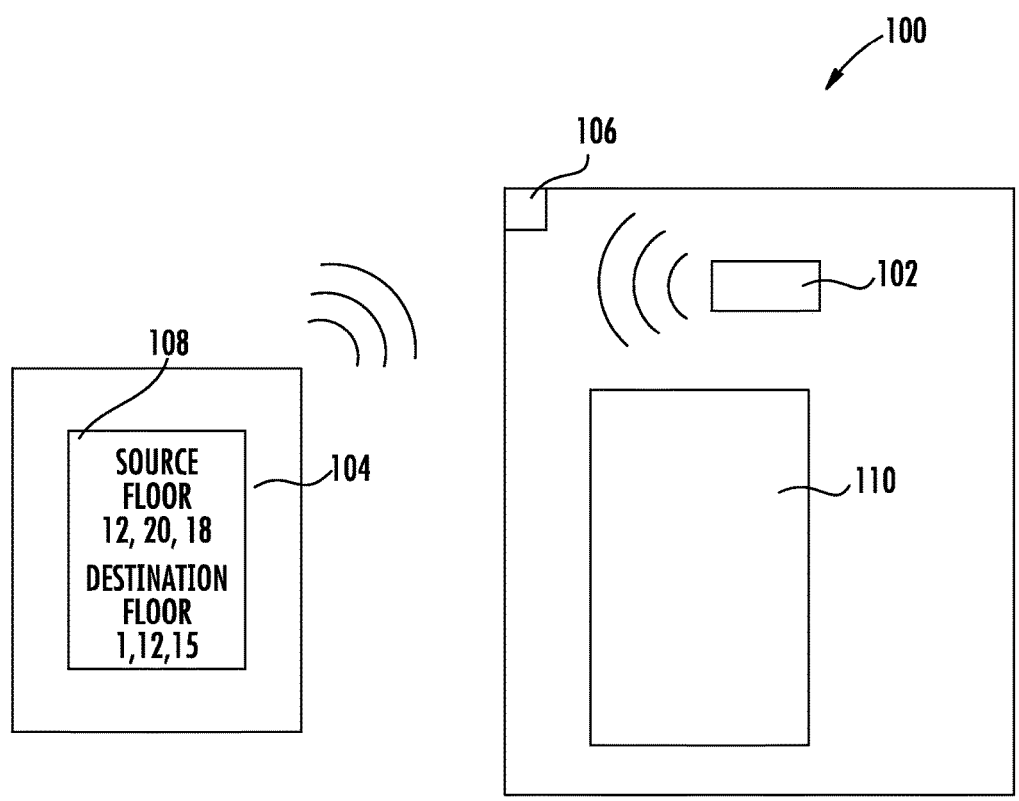
FIG. 1 is a schematic view of a system used to select a source floor and a destination floor.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 2:
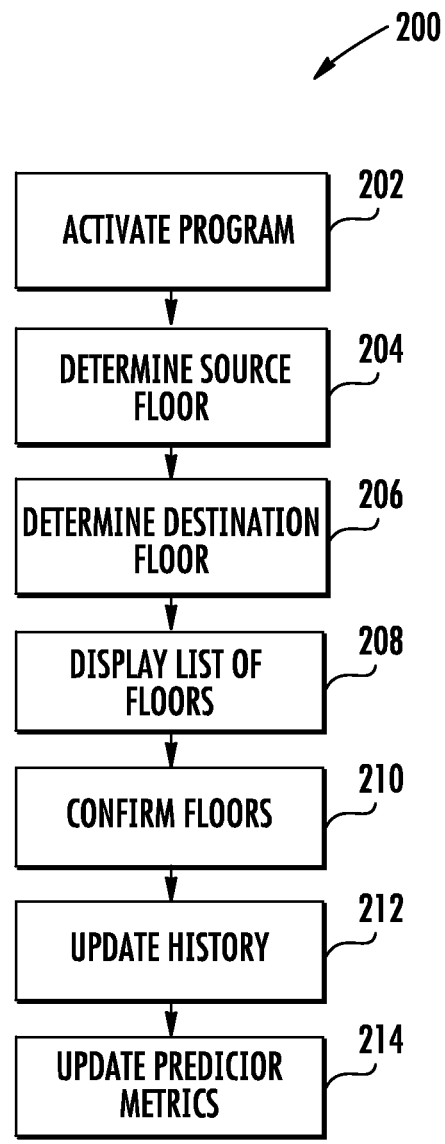
FIG. 2 illustrates a method for automatically determining a source floor and a destination floor of an elevator user.

FIG. 1 is a schematic view of a system 100 used to determine a source floor and suggest a destination floor of an elevator 110. FIG. 2 illustrates a method 200 for automatically determining a source floor and suggesting a destination floor using the system 100. The system 100 includes a building device 102 and a mobile device 104 in communication with the building device 102. The building device 102 is in communication with the elevator 110. At step 202, the mobile device 104 activates a program for determining a source floor of the mobile device user and suggesting a destination floor of the mobile device user.

At step 204, as the user holding the mobile device 104 approaches the elevator, the mobile device 104 and/or the building device 102 are queried to determine the source floor of the user. For example, when querying the building device 102, wireless transmitter beacons 106 electronically coupled to the building device 102 may detect the mobile device 104 through a communication signal between the mobile device 104 and the beacon 106. In particular, if a beacon 106 located on the twentieth floor communicates with the mobile device 104, the building device 102 determines that the user is located on the twentieth floor, and thus the twentieth floor is the source floor. The source floor is then communicated from the building device 102 to the mobile device 104. Alternatively, the building device 102 may communicate with the mobile device 104 through a building network, a wireless network, and/or external sensors located throughout the building.

In at least one other embodiment of step 204, the mobile device 104 is equipped with a global positioning system (GPS) module and uses a GPS location of the mobile device 104 to determine the source floor. For example, based on the elevation of the mobile device 104, the mobile device 104 and/or building device 102 may predict a position of the mobile device 104 within the building to determine the source floor. Similarly, the mobile device 104 may detect an altitude and/or a pressure of the atmosphere. The GPS location, altitude, and/or pressure may be utilized to determine the vertical position of the mobile device 104 relative to the ground. Based on this determination, the source floor may be predicted.

In at least one other embodiment, the mobile device 104 queries the user's calendar to predict the location of the user. For example, if the user's calendar indicates that the user has a meeting on the twentieth floor at noon, the mobile device 104 can predict that after noon the user will be located on the twentieth floor. In another example, at 8:00 AM the mobile device 104 may predict that the user is arriving at the building and the first floor will be the source floor. By accessing the user's calendar, the mobile device 104 can predict a position of the user within the building throughout the entire day.

In at least one other embodiment, the mobile device 104 may assume that the user's most recent destination floor is the current source floor. Alternatively, the mobile device 104 may analyze a history of source floors to determine the user's source floor.

At step 206, the mobile device 104 is queried to suggest the destination floor of the user. For example, the mobile device 104 may query the user's third party calendar to suggest the user's next destination floor. For example, if the user's calendar indicates that the user has a meeting on the twentieth floor at noon, the mobile device 104 can suggest to the user that prior to noon the destination floor will be the twentieth floor. In another example, at 5:00 PM the mobile device 104 may suggest to the user that the user is leaving the building and the first floor will be the destination floor. Alternatively, the mobile device 104 may analyze a history of destination floors to determine the user's destination floor.

At step 208, the mobile device 104 displays a list 108 of potential source floors and destination floors. The list 108 of source floors and destination floors includes a subset of the total floors of the building. The subset is determined by the most likely floors that the user will be traveling from and traveling to. At step 210, the user confirms, using the mobile device 104, the source floor and the destination floor. At any time the user can override the system and manually input a source floor or destination floor. The mobile device 104 communicates the source floor and destination floor to the building device 102 so that the building device 102 dispatches the elevator 110 to the source floor and places a call request to the elevator to take the user to the destination floor.

At step 212, the mobile device 104 adds the source floor and the destination floor to a history of the user's elevator travel. The history includes source floor data and destination floor data that may be later utilized to determine future source floors and destination floors. For example, the data may include a history of the user leaving the twentieth floor each day at noon and traveling to the first floor. Artificial intelligence algorithms may utilize the source floor data and the destination floors data to predict patterns of usage that may vary based on weekday, weekend, time of day, or seasonal patterns. At step 214, the mobile device updates predictor metrics so that the patterns may be utilized to predict the source floor and the destination floor in the future.

It will therefore be appreciated that disclosed embodiments enable the mobile device to predict trends in the utilization for an overall building population. By predicting these trends, source floors and destination floors can be automatically determined, thereby reducing the time associated with waiting for elevators.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method for automatically dispatching an elevator based on a user's location, the method comprising:
   querying a calendar of a mobile device of a user to retrieve meeting information associated with the user;
   displaying to the user a suggestion of at least one of the user's source floor and the user's destination floor based on the retrieved meeting information; and
   confirming at least one of the user's source floor and the user's destination floor.

2. The method of claim 1, wherein displaying the at least one of the user's source floor and the user's destination floor further comprises displaying the at least one of the user's source floor and the user's destination floor from a subset of total floors based on a present time of day.

3. The method of claim 1, wherein displaying the at least one of the user's source floor and the user's destination floor further comprises displaying the at least one of the user's source floor and the user's destination floor from a subset of total floors based on a present time of day.

4. The method of claim 1, further comprising communicating with a building device to retrieve an indication of a present floor of the building device, wherein displaying the at least one of the user's source floor and the user's destination floor further comprises displaying the at least one of user's source floor and the user's destination floor as a function of the retrieved indication.

5. The method of claim 1, further comprising querying the mobile device of the user to determine an altitude with the mobile device, wherein displaying the at least one of user's source floor and the user's destination floor is further based on the determined altitude.

6. The method of claim 1, further comprising querying a mobile device of the user to determine a pressure with the mobile device, wherein displaying the at least one of user's source floor and the user's destination floor is further based on the determined pressure.

7. The method of claim 1, further comprising storing a history of source floors and destination floors in the mobile device of the user, wherein displaying the at least one of user's source floor and the user's destination floor is further based on the history of source floors and destination floors.

8. The method of claim 1, further comprising enabling the user to manually enter at least one of the source floor or the destination floor.

9. A method for automatically dispatching an elevator based on a user's location, the method comprising:
   querying a mobile device of a user for source floor data and destination floor data, wherein the source floor data includes a history of source floors previously traveled by the user and the destination floor data includes a history of destination floors previously traveled by the user;
   determining a source floor of the user based on the source floor data;
   confirming the source floor;
   suggesting a destination floor of the user based on destination floor data;
   confirming the destination floor;
   updating the source floor data and the destination floor data based on a source floor and a destination floor selected by the user;
   querying a calendar on the mobile device to retrieve meeting information associated with the user, wherein suggesting the destination floor is further based on the retrieved meeting information.

10. The method of claim 9, further comprising communicating with a building device to retrieve an indication of a present floor of the mobile device, wherein determining the source floor further comprises determining the source floor based on the retrieved indication.

11. The method of claim 9, wherein determining the source floor further comprises determining an altitude of the mobile device.

12. The method of claim 9, wherein determining the source floor further comprises determining an atmospheric pressure at the mobile device.

13. The method of claim 9, further comprising enabling the user to manually enter at least one of the source floor or the destination floor via an interface of the mobile device.

* * * * *